(12) United States Patent
Seong

(10) Patent No.: US 9,393,750 B2
(45) Date of Patent: Jul. 19, 2016

(54) METHOD OF COATING SEALANT COMPOSITION TO INNER SURFACE OF TIRE AND TIRE MANUFACTURED BY THE SAME

(71) Applicant: Hankook Tire Co., Ltd., Seoul (KR)

(72) Inventor: Dong Won Seong, Daejeon (KR)

(73) Assignee: Hankook Tire Co., Ltd., Seoul (KR)

(*) Notice: Subject to any disclaimer, the term of this patent is extended or adjusted under 35 U.S.C. 154(b) by 122 days.

(21) Appl. No.: 14/169,099

(22) Filed: Jan. 30, 2014

(65) Prior Publication Data

US 2015/0107743 A1   Apr. 23, 2015

(30) Foreign Application Priority Data

Oct. 22, 2013   (KR) .......................... 10-2013-0125807

(51) Int. Cl.
*B29D 30/06* (2006.01)
*B60C 19/12* (2006.01)
*B29C 73/20* (2006.01)
*B05B 13/06* (2006.01)

(52) U.S. Cl.
CPC ............ *B29D 30/0685* (2013.01); *B29C 73/20* (2013.01); *B60C 19/122* (2013.04); *B05B 13/06* (2013.01); *B29D 2030/0697* (2013.01); *Y10T 152/10684* (2015.01)

(58) Field of Classification Search
CPC ............................................. B29D 2030/0697
See application file for complete search history.

(56) References Cited

U.S. PATENT DOCUMENTS 4,433,011 A * 2/1984 Larson .................... B05B 13/06
                                                        118/318
7,613,675 B2   11/2009   Hawkins et al.

FOREIGN PATENT DOCUMENTS

KR   10-2013-0022893 A   3/2013

OTHER PUBLICATIONS

Sheng et al.; Automated CAD-Guided Robot Path Planning for Spray Painting of Compound Surfaces; Proceedings of the 2000 IEEE/RSJ International Conference on Intelligent Robots and Systems; 2000.*

* cited by examiner

*Primary Examiner* — Michael P Rodriguez
(74) *Attorney, Agent, or Firm* — Blakely, Sokoloff, Taylor & Zafman LLP

(57) ABSTRACT

Disclosed herein are a method of coating a sealant composition to an inner surface of a tire, and a tire manufactured by the same. The method includes extracting coordinates for coating a sealant composition with reference to a central point of a target tire using a computer-aided design (CAD) file of the target tire; setting robot moving coordinates and setting a coating width based on the extracted coordinates; and coating the sealant composition while moving a nozzle provided to a robot arm and ejecting the sealant composition toward the set coordinates.

3 Claims, 3 Drawing Sheets

METHOD OF COATING SEALANT COMPOSITION TO INNER SURFACE OF TIRE AND TIRE MANUFACTURED BY THE SAME

BACKGROUND

1. Field of the Invention

The present invention relates to a method of coating a sealant composition to an inner surface of a tire, which include: extracting coordinates for coating the sealant composition with reference to a central point of a target tire using a computer-aided design (CAD) file of the target tire; setting robot moving coordinates and setting a coating width based on the extracted coordinates; and coating the sealant composition while moving a nozzle provided to a robot arm and ejecting the sealant composition toward the set coordinates, and a tire manufactured by the same.

2. Description of the Related Art (1) Conventionally, in order to prevent a tire from puncture, a solution is sprayed into an air inlet of the tire. However, this method has a problem of insufficient performance.

(2) In addition, although various sealant compositions for tires have been patented, there is no patent regarding a method of coating a sealant composition to an inner surface of a tire.

As a background technique of the present invention, Korean Patent Publication No. 10-2013-0022893A discloses a pneumatic tire that includes a porous sound-absorbing material attached by a sealant layer formed on an inner surface of an inner liner of a tire, wherein the sealant layer contains 100 to 400 parts by weight of poly(isobutylene), 10 to 100 parts by weight of carbon black, and 1 to 15 parts by weight of a curing agent with regard to 100 parts by weight of a butyl rubber. However, this technique is different in terms of technical features from the present invention which provides a method of exactly and quickly coating a sealant composition to a uniform thickness to a desired position inside a tire, thereby firmly attaching and coating the sealant composition while reducing material costs.

BRIEF SUMMARY

The present invention has been made to solve such problems in the related art, and one object of the present invention is to reduce work time by rotating a tire and quickly coating a sealant composition through a nozzle while moving the nozzle in an axial direction.

Another object of the present invention is to exactly and uniformly coat a sealant composition to a desired thickness to a target position of a tire by extracting a central point of the tire based on tire profile coordinates and coating the sealant composition through a nozzle of a robot which moves along a predetermined path based on the extracted central point.

In accordance with one aspect of the present invention, a method of coating a sealant composition to an inner surface of a tire includes: extracting coordinates for coating a sealant composition with reference to a central point of a target tire using a computer-aided design (CAD) file of the target tire; setting robot moving coordinates and setting a coating width based on the extracted coordinates; and coating the sealant composition while moving a nozzle provided to a robot arm and ejecting the sealant composition toward the set coordinates.

In accordance with another aspect of the present invention, the nozzle may be moved in an axial direction while the tire is rotated, in order to quickly coat the sealant composition to the inner surface of the tire.

In accordance with a further aspect of the present invention, the nozzle may discharge the sealant composition in all directions of 360 degrees while moving in a cross-sectional direction upon rotation of the tire in order to coat the sealant composition to an accurate position on the inner surface of the tire, and a distance between a distal end of the nozzle and a central axis may be measured by a distance sensor and transmitted for feedback to a robot controller to control the nozzle to move at a constant linear speed based on the transmitted data in order to uniformly coat the sealant composition to the inner surface of the tire.

In accordance with yet another aspect of the present invention, there is provided a tire, to an inner surface of which a sealant composition is coated by the foregoing method.

BRIEF DESCRIPTION OF THE DRAWINGS

The above and other aspects, features and advantages of the present invention will become apparent from the detailed description of exemplary embodiments given in conjunction with the accompanying drawings, in which.

DESCRIPTION OF THE EMBODIMENTS

Figure 1:
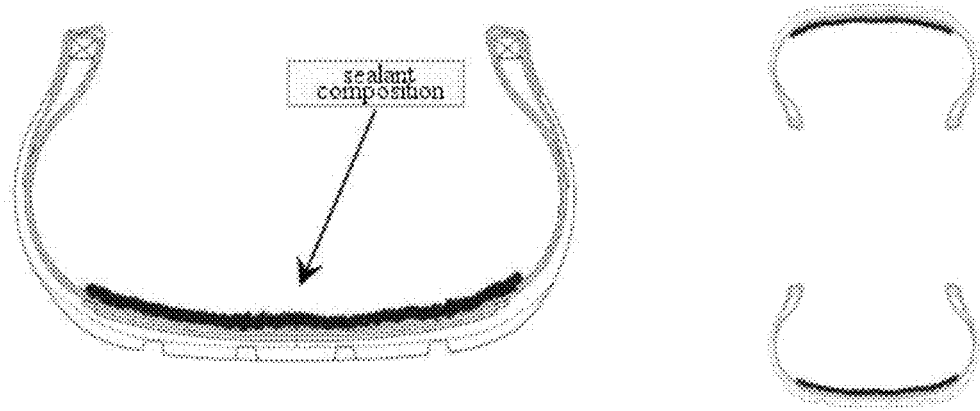
FIG. 1 illustrates that a sealant composition is coated to an inner surface of a tire by a method according to one embodiment of the present invention.
Figure 2:
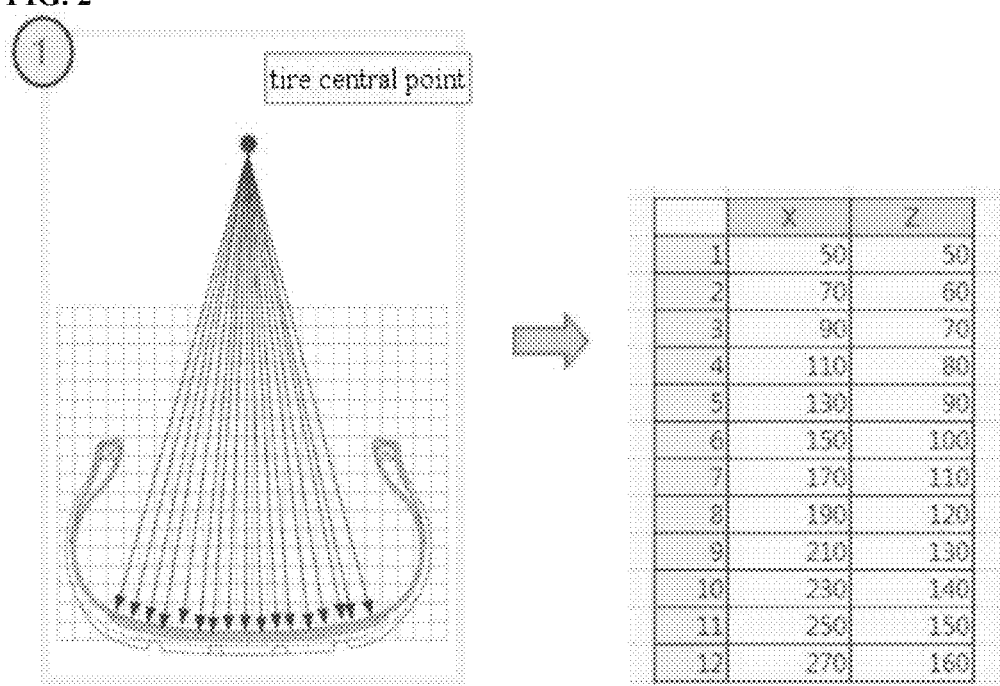
FIG. 2 illustrates a method of extracting coordinates with reference to a central point of a tire through a CAD file of the tire.
Figure 3:
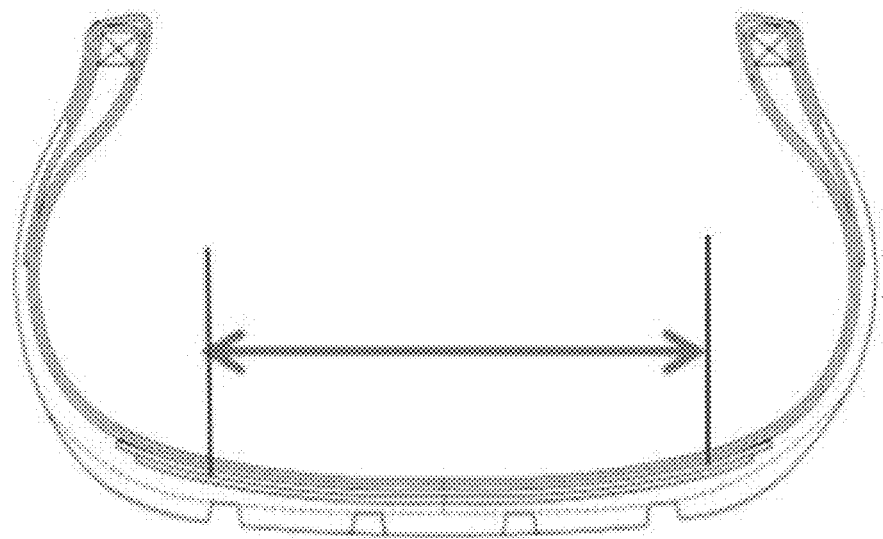
FIG. 3 illustrates that robot moving coordinates and a coating width are set based on the extracted coordinates.
Figure 4:
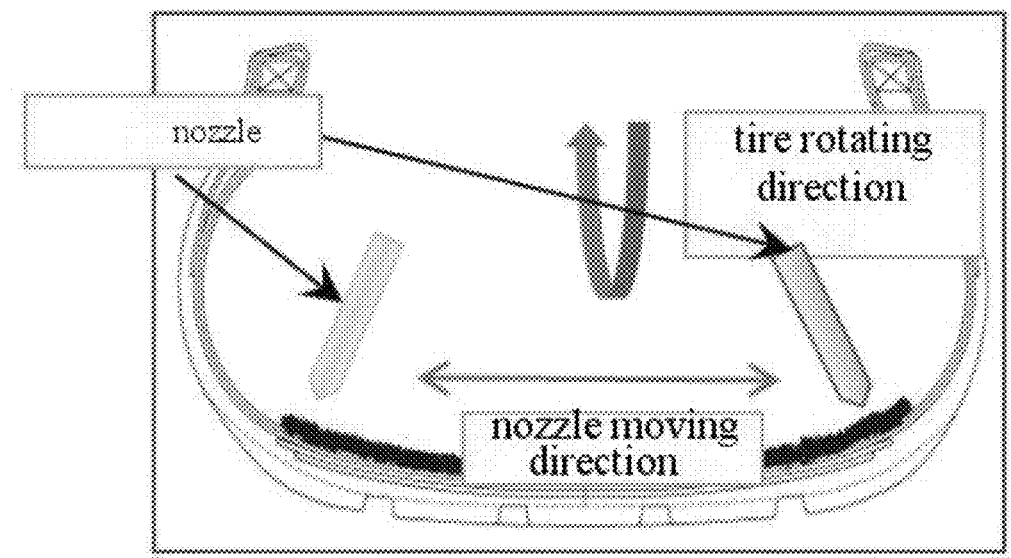
FIG. 4 illustrates a moving direction of a nozzle and a rotating direction of a tire.
Figure 5:
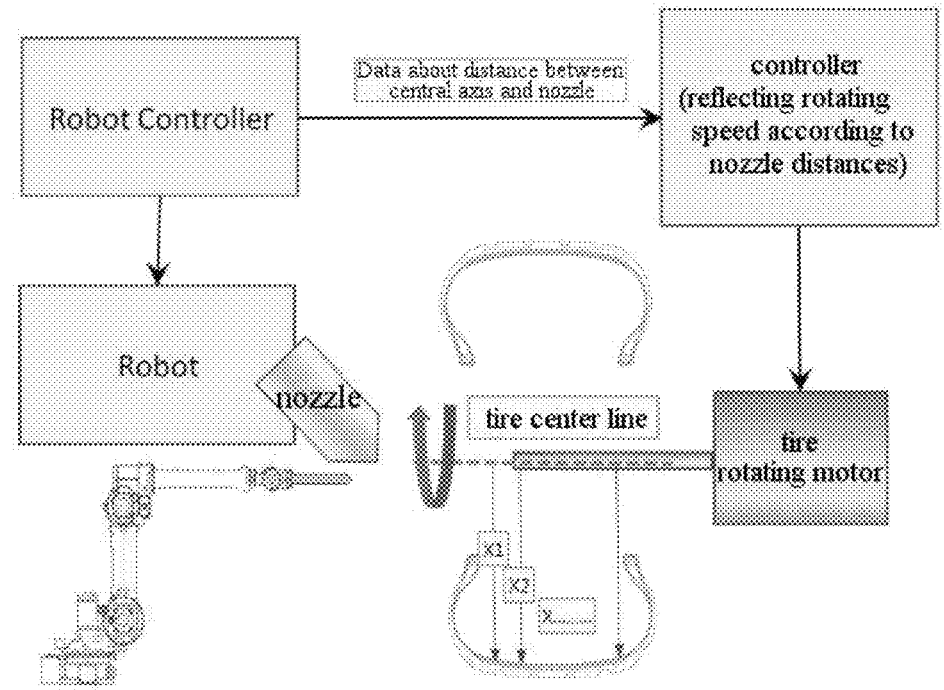
FIG. 5 illustrates a linear speed control method for uniformly coating a sealant composition.

Hereinafter, embodiments of the present invention will be described in detail with reference to the accompanying drawings.

According to one embodiment of the present invention, a method of coating a sealant composition to an inner surface of a tire includes: extracting coordinates for coating a sealant composition with reference to a central point of a target tire using a computer-aided design (CAD) file of the target tire; setting robot moving coordinates and setting a coating width based on the extracted coordinates; and coating the sealant composition while moving a nozzle provided to a robot arm and ejecting the sealant composition toward the set coordinates.

In addition, according to another embodiment, the nozzle may be moved in an axial direction while the tire is rotated, in order to quickly coat the sealant composition to the inner surface of the tire.

Further, the nozzle may discharge the sealant composition in all directions of 360 degrees while moving in a cross-sectional direction upon rotation of the tire, and a distance between a distal end of the nozzle and a central axis may be measured by a distance sensor and transmitted for feedback to a robot controller to control the nozzle to move at a constant linear speed based on the transmitted data in order to uniformly coat the sealant composition to the inner surface of the tire. Hereinafter, detailed embodiments of the present invention will be described.

EMBODIMENTS

Detailed embodiments of the present invention are as follows.

Detailed features of the present invention are as follows.

A method of coating a sealant composition according to the present invention is as follows.

The sealant composition for absorbing sound and preventing puncture is coated to an inner surface (i.e., an inner side opposite to a tread) of a tire.

When the tire is rotated, a nozzle ejects the sealant composition while moving in an axial direction, thereby uniformly coating the sealant composition.

A method of coating a sealant composition to an inner surface of a tire according to one embodiment of the present invention will be described in more detail. The method includes:

(1) extracting coordinates for coating a sealant composition with reference to a central point of a target tire using a computer-aided design (CAD) file of the target tire;

(2) setting robot moving coordinates and setting a coating width based on the extracted coordinates; and (3) coating the sealant composition while moving a nozzle provided to a robot arm and ejecting the sealant composition toward the set coordinates.

At this time, the tire is rotated such that the nozzle ejects the sealant composition in all directions of 360 degrees while moving in a cross-sectional direction.

Since there is a limit to a width to which the sealant composition is coated in a single pass, the sealant composition is coated dozens of times.

(4) When a rotating speed of the tire is controlled upon coating of the sealant composition, the sealant composition can be thickly coated to a position adjacent to a rotary axis. Thus, a distance between a coating position (a distal end of the nozzle) and a central axis is fed back by a robot controller to control the nozzle to move at a constant linear speed, thereby uniformly coating the sealant composition.

Terms used in this specification are as follows.

The sealant composition refers to a sealant composition coated to the inner surface of the tire in order to prevent the tire from puncture The inner surface of the tire refers to a rubber surface that constitutes an interior of the tire in order to maintain the air pressure of the tire.

The nozzle refers to a device for ejecting the sealant composition to the inner surface of the tire in order to coat the sealant composition.

The tire center line becomes a central axis when the tire rotates.

The present invention has an advantageous effect of quickly, exactly and uniformly coating a sealant composition solution in accordance with tire-profile coordinates.

In addition, the present invention has an advantageous effect on preventing the tire from puncture and absorbing sound by coating the sealant composition to a uniform thickness or to the same thickness through linear speed control for the inside of one tire.

Further, the present invention has another effect on reducing time taken in coating the sealant composition by allowing the nozzle to moved in the axial direction while the tire is rotated, as compared with a typical method in which only the nozzle is moved.

The present invention has a further effect on improving durability and adhesion by coating the sealant composition corresponding to the shape of the tire.

The present invention has high industrial applicability since there is provided a tire, to an inner surface of which a sealant composition is coated by the method comprising: extracting coordinates for coating a sealant composition with reference to a central point of a target tire using a computer-aided design (CAD) file of the target tire; setting robot moving coordinates and setting a coating width based on the extracted coordinates; and coating the sealant composition while moving a nozzle provided to a robot arm and ejecting the sealant composition toward the set coordinates.

Although some embodiments have been described with reference to the accompanying drawings, it should be understood that the present invention is not limited to these embodiments and can be made in various different ways, and that various modifications, variations, and alterations can be made by those skilled in the art without departing from the spirit and scope of the present invention. Therefore, the scope of the present invention should be determined by the claims and equivalents thereof.

What is claimed is:

1. A method of coating a sealant composition to an inner surface of a tire, the method comprising:
   extracting coordinates for coating a sealant composition with reference to a central point of a target tire using a computer-aided design (CAD) file of the target tire;
   setting robot moving coordinates and setting a coating width based on the extracted coordinates; and
   ejecting the sealant composition by a nozzle provided to a robot arm, wherein the robot arm is moved according to the set coordinates, wherein a distance between a distal end of the nozzle and a central axis of the tire is measured by a distance sensor and transmitted for feedback to a robot controller to control the nozzle to move at a constant linear speed based on the transmitted data in order to uniformly coat the sealant composition to the inner surface of the tire.

2. The method according to claim 1, wherein the nozzle is positioned relative to the tire in a manner to eject the sealant composition from the nozzle onto the inner surface of the tire while the tire is rotated.

3. The method according to claim 1, wherein the nozzle is positioned relative to the tire in a manner to eject the sealant composition from the nozzle in a 360 degree arc onto the inner surface of the tire.

* * * * *